(12) United States Patent
Costanzi et al.

(10) Patent No.: US 8,178,607 B2
(45) Date of Patent: May 15, 2012

(54) POLYAMIDE COMPOSITIONS FLAME RETARDED WITH ALUMINIUM

(75) Inventors: Silvestro Costanzi, Genoa (IT); Maurizio Leonardi, Genoa (IT)

(73) Assignee: Italmatch Chemicals S.p.A., Genoa (IT)

( * ) Notice: Subject to any disclaimer, the term of this patent is extended or adjusted under 35 U.S.C. 154(b) by 300 days.

(21) Appl. No.: 10/585,421

(22) PCT Filed: Jan. 7, 2004

(86) PCT No.: PCT/IB2004/000014
§ 371 (c)(1),
(2), (4) Date: Nov. 3, 2006

(87) PCT Pub. No.: WO2005/075566
PCT Pub. Date: Aug. 18, 2005

(65) Prior Publication Data
US 2008/0033079 A1 Feb. 7, 2008

(51) Int. Cl.
*C08K 3/32* (2006.01)
(52) U.S. Cl. ......... 524/414; 252/609; 524/126; 524/135
(58) Field of Classification Search .................... 524/126
See application file for complete search history.

(56) References Cited

U.S. PATENT DOCUMENTS

| | | | |
|---|---|---|---|
| 3,968,071 A * | 7/1976 | Miyamoto et al. | 524/606 |
| 5,409,980 A * | 4/1995 | Myszak, Jr. | 524/409 |
| 5,773,556 A | 6/1998 | Kleiner et al. | |
| 6,031,032 A * | 2/2000 | Horacek et al. | 524/100 |
| 6,211,266 B1 * | 4/2001 | Weber et al. | 523/212 |
| 6,211,402 B1 * | 4/2001 | Kleiner | 562/8 |
| 6,547,992 B1 * | 4/2003 | Schlosser et al. | 252/609 |
| 2004/0051088 A1 * | 3/2004 | Schlosser et al. | 252/609 |

FOREIGN PATENT DOCUMENTS

| | | | |
|---|---|---|---|
| JP | 03 054252 | * | 3/1991 |
| WO | 02/28953 | | 4/2002 |
| WO | WO 02/28953 | * | 4/2002 |

OTHER PUBLICATIONS

Chiba, Derwent Abstract (1991-113489).*
International Search Report for PCT/IB2004/000014 dated Jul. 27, 2004.
Database WPI, Section CH, Week 199116, AN 1991-113489 XP002285113.
Database HCAPLUS 'Online!, Chemical Abstract Service, Sep. 6, 1991, Kataoka et al., *Flame-retardant polyamide compositions with heat resistance*, XP002285112.
Patent Abstracts of Japan, vol. 2000, No. 26, Jul. 1, 2002, for JP 2001-261973, Sep. 26, 2001.

* cited by examiner

*Primary Examiner* — Doris Lee
(74) *Attorney, Agent, or Firm* — Nixon & Vanderhye P.C.

(57) ABSTRACT

The present invention relates to a thermoplastic composition comprising at least aluminum hypophosphite (aluminum phosphinate), corresponding to the chemical formula $Al(H_2PO_2)_3$ as halogen-free flame retardant agent, and at least a polymer based on polyamide. The flame retarded halogen-free thermoplastic molding compositions according to the invention is used to produce articles based on polyamide polymers with or without glass fiber reinforcement, which are flame retarded.

12 Claims, No Drawings

POLYAMIDE COMPOSITIONS FLAME RETARDED WITH ALUMINIUM

This application is the US national phase of international application PCT/IB2004/000014 filed 7 Jan. 2004 which designated the U.S., the entire content of which is hereby incorporated by reference.

SUBJECT OF THE INVENTION

The present invention relates to halogen free flame retarded polyamide articles and a process for their preparation.

BACKGROUND OF THE INVENTION

As an alternative for the well known halogen based-flame retardant containing systems, in the last years the market is increasingly interested in halogen free flame retardant additives to be used in the production of corresponding flame-retardant compositions, generally speaking thermoplastic compositions.

Significant requirements for these products are: high flame retardant effectiveness in reinforced and unreinforced articles, pale intrinsic colour, good heat stability and good mechanical and electrical properties.

The known halogen-free flame retardant additives mostly used in thermoplastic polymers are:

Inorganic flame retardants like Magnesium hydroxide. The product must be used in large amounts to be effective so that the mechanical properties of the related thermoplastic articles are dramatically damaged.

Melamine derivatives, like melamine cyanurate, melamine (poly)phosphate or melamine pyrophosphate. These products do not have sufficient thermal stability for overcoming the processing conditions of glass fibre reinforced polyamides and therefore cannot be used as universal additives.

Organic derivatives of phosphoric acid such as phosphoric esters (valence state of P=+5). These products are not very effective, tend to bleed out on exposure to heat, are generally in a liquid status, being therefore difficult to handle, are not hydrolytically stable, therefore affect mechanical and thermal properties of final articles. Although many improvements have been introduced with the new high molecular weight products, however the related polymer articles do not have fully satisfactory performances due to the unbalanced combination of flammability with impact resistance, heat stability and weather resistance.

Red-Phosphorus is the most effective flame retardant additive especially for glass fiber reinforced polyamides but unfortunately its inherent deep-red colour makes the related polymer product difficult to be used for natural or light colours applications.

Organic phosphinates with particular regard to aluminium and zinc phosphinates, have been also described as flame retardant additives for reinforced polyamides (U.S. Pat. No. 6,547,992; U.S. Pat. No. 6,255,371) especially in combination with nitrogen containing compounds like melamine derivatives, tris(hydroxyethyl) isocyanurate, benzoguanamine, allantoin or similar products (EP 97/01664).

Hypophosphorous acid metal salts are also known with the chemical name of inorganic phosphinates. These products have been recently described (U.S. Pat. No. 4,618,633) as halogen free flame retardant agents for fire proofing styrene containing polymers like: polystyrene (PS), high impact polystyrene (HIPS), styrene-acrylonitrile copolymers (SAN), acrylonitrile-butadiene-styrene polymers (ABS). More recently, Calcium hypophosphite has been reported to be especially effective in polyester resin compositions when used in combination with nitrogen containing compounds like: melamine cyanurate, melamine polyphosphate, melamine borate, melamine pyrophosphate, ureaphosphate or similar products (U.S. Pat. No. 6,503,969; WO 09817720; DE 19904814; DE 10137930; EP 0919591) but it does not work in polyamide articles.

OBJECT OF THE INVENTION

It is an object of the present invention to provide flame retarded halogen-free thermoplastic moulding compositions and articles based on polyamide polymers with or without glass fiber reinforcement, which maintain good mechanical characteristics while provide very good flame retardant properties.

Another object of the present invention is to provide halogen-free flame retarded moulding compositions and corresponding moulded articles based on polyamide polymers, with particular regard to glass fiber reinforced polyamide characterised by a very low thickness, which maintain high thermal stability during processing, high degree of retention of mechanical properties, good weather resistance and good electrical properties, while being characterised by significant flame retardant properties.

Still another object of the present invention is to provide halogen-free flame retarded moulding compositions and moulded articles based on polyamide, particularly on glass fiber reinforced polyamide, ranking V0 according to UL 94 classification and passing the GWIT test at 775° C.

Another object of the present invention is to provide a process for the preparation of halogen-free flame retarded moulding compositions and moulded articles based on polyamide.

DESCRIPTION OF THE INVENTION

The present invention relates to a thermoplastic composition comprising at least aluminium hypophosphite (aluminium phosphinate) as halogen-free flame retardant agent and at least a polymer based on polyamide.

According to the present invention, aluminium phosphinate is an inorganic compound corresponding to the chemical formula $Al(H_2PO_2)_3$; it is obtained by reacting Sodium hypophosphite and aluminium chloride in watery solution at a temperature of about 100° C. as reported in the literature (J. Chem. Soc. 1952, 2945).

The aluminium phosphinate is thermally stable and does not cause decomposition of polymers during processing and does not affect the plastic moulding composition during the production process.

In addition the product is sparingly soluble in water and it is non volatile under the usual condition for preparing and processing thermoplastic polymers.

Always according to the present invention, aluminium phosphinate may be used as such or in combination with nitrogen containing compounds, in a range of from 1% to 30% weight on the weight of polymer composition, preferably from 7 to 20% weight more preferably from 12% to 18% weight, however the ideal amount of the product depends on the nature of the used polymers and of the nature of the other components (if present).

The polymer compositions which contain aluminium phosphinate as above reported, develop good flame retardant grade ranking V0 at 0.8 mm in thickness, according to UL 94 standards, and passing the GWIT at 775° C. for thicknesses higher than 1 mm, according the IEC 61335-1 standards.

In order to achieve the above performances, it is advisable that the average particle size (d50%) of the aluminium phosphinate powder is lower than 40 μm and the highest particle size is below 100 μm, more particularly it is preferable that d50% is below 20 μm and the highest particle size is below 50 μm.

According to the present invention, the polyamide resins to be rendered flame retarded comprise in particular:
a) polyamide prepared by the polycondensation reaction of saturated dicarboxylic acid having from 6 to 12 carbon atoms, with a saturated aliphatic diprimary diamine having from 6 to 12 carbon atoms,
b) polyamino acids prepared either by a direct polycondensation reaction of an omega amino-alkanoic acid and containing a hydrocarbon chain having from 4 to 12 carbon atoms or by hydrolytic ring opening and polymerisation of lactams derived from such acids,
c) the co-polyamides prepared from the starting monomers of the afore mentioned polyamides provided that the acid component of said copolyamides may in part comprise terephtalic acid and/or isophtalic acid,
d) mixtures of such polyamides.

Exemplary polyamides prepared via polycondensation reaction of diacids and diamines include:
Nylon 6,6 (polymer of hexamethylenediamine and adipic acid),
Nylon 6,9 (polymer of hexamethylene diamine and azelaic acid),
Nylon 6,12 (polymer of hexamethylene diamine and dodecanoic acid).

Exemplary polyamino acids include:
Nylon 4 (polymer of 4-amino butanoic acid or gamma-butyro lactam),
nylon 6 (polymer of epsilon caprolactam),
Nylon 8 (polymer of capryllactam),
Nylon 12 (polymer of lauryllactam).

Exemplary copolyamides include Nylon 6/6,6 (copolymer of haxamethylene diamine, adipic acid and caprolactam), nylon 6,6/6,10 (copolymer of hexamethylenediamine, adipic acid and sebacoil acid).

The preferred polyamides to be flame retarded according to the present invention are: Polyamide (Nylon) 6, Polyamide (Nylon) 6,6, Polyamide (Nylon) 6/6,6.

It is also advantageous to use recycled polyamide polymers in mixture with the virgin ones.

The recycled materials are generally selected among:
post industrial products such as sprues from injection moulding, start up material from injection moulding and extrusion or edge trims from extruder sheets or films;
post consumer recycled materials such as those collected and treated after utilization by end consumer.

Said recycled materials may be used as pellets or as regrind

At last it is advisable to pre-dry the polymers (virgin resin and the recycled material) up to a level of moisture from 0.1% to 0.5% w before extruding or moulding.

Always according to the present invention, the thermoplastic moulding composition may optionally comprise additives and inorganic fillers. More particularly, said additives, used as such or in mixture, might be present in an amount ranging from 0.5 to 10% by weight and might be selected from: processing aids, heat and process stabilisers, UV stabilisers, antidripping agents (PTFE-Polytetrafluoroethylene), pigments, impact modifier resins, antiacids, etc. Said inorganic fillers are selected for example among talc, glass fibers, carbon fibers, chalk, mica, wollastonite or similar products and they can be used as such or in mixture up to a level of 50% by weight on weight of polymer.

The total of percentage by weight of components are 100%.

Examples of heat stabilisers are sterically hindered phenols and/or aromatic phosphites or phosphonites, CuI/KI and mixture of these to be used in concentration of up to 1% weight on the weight of polymer.

UV stabilisers which are usually added in an amount of up to 2% weight on the weight of polymer composition are various salycilates, resorcinols, benzotriazols, benzophenones and hindered amines derivatives.

As lubricants and mould releasing agents are preferably long chain fatty acids, like stearic acid, or fatty acid salts, like sodium, calcium or zinc stearate, or montan waxes, or an ester or amide obtained by reacting saturated aliphatic carboxylic acids having from 10 to 40 carbon atoms, preferably from 16 to 22 carbon atoms, with saturated aliphatic alcohols or amines having from 2 to 40 carbon atoms, preferably from 2 to 6 carbon atoms. Examples of preferred esters and amides are: pentaerythritol tetrastearate, glycerol trilaurate, sorbitan dioleate, ethylenediamine distearate.

The impact modifier resins are generally copolymers which contain at least two of the following monomers: ethylene, propylene, butadiene, isobutene, isoprene, vinyl acetate, styrene, acrylonotrile, acrylate and/or metacrylate.

Some preferred types of impact modifiers are those known as ethylene-propylene (EPM) and ethylene-propylene-diene (EPDM) rubbers.

EPM and EPDM rubbers can preferably have been grafted with reactive carboxilic acids or with derivatives of these such as for example: acrylic acid, methacrylic acid, maleic anhydride. When the polymer compositions contain an impact modifier resin up to 5% w, they exhibit an improved fire behaviour and superior mechanical properties.

Among colorants the preferred products are selected among inorganic pigments like titanium dioxide, iron oxide, carbon black but can be also used as organic pigments phtalocyanines, quinacridone, perylene, nigrosine, anthraquinones.

The novel moulding composition may also contain, as an additional component, fluorine-containing ethylene polymers which exhibit a resin melt dropping preventing effect when the composition is fired. These products can be used in an amount of up to 2%, preferably up to 1%, based on the weight of thermoplastic composition.

Examples of these fluorine-containing ethylene are: polytetrafluoroethylene (PTFE) or tetrafluoroethylene-hexafluoropropylene copolymers, at the date of the filing of the present application available in the market with Algoflon™. Particularly preferred are those fluorine containing polymers with particle size from 0.1 μm to 10 μm.

The flame retardant moulding composition of present invention may further contain plasticizers to be used in an amount of up to 2% by weight on the weight of thermoplastic composition. Said products generally enhance the dispersion of inorganic materials in the polymer matrix. Examples of the used plasticizers include phthalates, silicons or also organosiloxanes bringing functional groups like hydroxyl, carboxyl, amino, or epoxy group.

The flame retardant moulding composition of present invention may further contain one or more antiacid components selected among the group of hydrotalcites, magnesium carbonate, hydromagnesite, zinc oxide, zinc borate, zinc stannate or similar products.

Always according to the invention, the thermoplastic moulding composition may comprise, as additional component, a filler.

In the meaning of the present invention, filler can be any fibrous or particulate substance known in the art and acting as reinforcement agent such as carbon fibers, glass fibres, glass beads, amorphous silica, kaolin, chalk, mica, calcinated kaolin, wollastonite, talc or similar products.

In order to improve the compatibility with thermoplastic resins, the fibrous fillers may have been surface treated with a silane compound and the particulate substances may have been surface treated with fatty acids or the like or may have been milled in presence of fatty acids or the like.

Any particulate substance available into the market as an additive for thermoplastic resin is suitable for the use in the composition according to the invention, provided that the average size of the granules is comprised in the range from 2 μm to 20 μm.

When used, the amount of the particulate substance to be added as reinforcement to the resin composition is up to 50%, preferably up to 30% by weight on the weight of resin. If the amount of particulate substance is higher than 40% the melt viscosity of the composition will be too high and the mouldability of the resin composition will be poor.

The amount of particulate substance to be added to the resin composition can be lower than 10% by weight on the weight of resin but in this case no advantage is observed in the mechanical properties of the final polymer articles.

The above products can also be used in mixture.

It has been surprisingly found that Aluminium hypophosphite is very effective flame retardant agent for polyamide based thermoplastic moulding compositions and in particular for reinforced polyamide based thermoplastics compositions.

According to this form of application the product can be added as such, or in combination with any nitrogen based compound such as melamine cyanurate, melamine polyphosphate, melamine borate, melamine pyrophosphate, ureaphosphate or similar products. Among the above reported nitrogen containing compounds, melamine polyphosphate, melamine pyrophosphate and melamine cyanurate are the preferred ones for improving both fire and mechanical properties.

The compositions according to the present invention show very good flame retardant properties and does not comprise any halogen based flame retardant agent. The moulded articles obtained using the compositions according to the invention maintain high thermal stability, for example during their processing, high retention of mechanical properties and good weather resistance.

The halogen-free flame retardant thermoplastic composition might be prepared by mixing and kneading the starting components and optionally the additional components in a predetermined ratio as above indicated.

Mixing and kneading operations may be effected in any well known device like banbury mixers, single screw extruders or twin screw extruders and then extruding them. The temperatures at which the components are kneaded are generally comprised between 250° C. and 300° C., depending on the selected components of the final products.

The extrudates are cooled and pelletized.

It is also possible to premix individual components with thermoplastic resins in order to prepare master batches which may contain the individual components or the whole additives in a predetermined ratio and after that proceed diluting them with other polymers before the extruding phase in an extruder device for producing pellets.

The resulting pellets may be moulded into various mouldings for example through injection moulding, blow moulding or injection compression moulding.

The novel thermoplastic moulding compositions have good mechanical and flame retardant properties.

The compositions according to the invention are suitable for producing mouldings for application in the electrical and electronic fields such as, for example, components for circuit breakers, switches, connectors or parts for office automation appliances, automotive, household or industrial use like televisions, telephones, personal computers etc.

The invention is described in more detail with reference to the following examples which, however are not intended to restrict the scope of the invention.

EXAMPLES

The components reported in the tables below are compounded in a twin screw extruder set at temperature between 250-290° C. After pelletting and drying, the pellets were injection moulded into test specimens to be used for the UL 94 flammability test method which prescribes:

the conditioning of 5 specimens (each formulation and thickness) for 24 h at 23° C. and 50% of relative humidity;

the positioning of each individual conditioned specimen in vertical position at about 20 cm from a below cotton flock;

2 applications of flame for each specimen (the second application starts as soon as the specimen ignited by the first application extinguishes).

The UL 94 test results have been reported in accordance with the following meaning also prescribed by the specification:

V0: when the 5 tested specimens have got total afterburning time no longer than 50 sec, less than 10 sec each application of the flame, and no burning drops are allowed.

V1: when the 5 tested specimens have got total burning time less than 150 sec, less than 30 sec each application of the flame and no flaming drops are allowed.

V2: when the 5 tested specimens have got total afterburning time of less than 150 sec, less than 30 sec each application of the flame and flaming drops are allowed.

When the test results do not meet the above V0, V1 and V2 criteria, no classification (nc) has been reported in the below tables.

At the same time the GWIT test has also been carried out according to the IEC 61335-1 standards.

In the following examples following materials were used as starting components:

Resins.

30% glass fiber reinforced Polyamide 6,6 resin: Latamid 6,6 H2 G/30 manufactured by Lati s.p.a.

30% glass fiber reinforced Polyamide 6 resin: Latamid 6 B G/30 manufacturede by Lati s.p.a.

Unfilled polyamide 6 resin: Latamid 6

Halogen Free Flame Retardant Additives.

Aluminium-phosphinate (AP), commercial available material endued with an average particle size (d50%) lower than 10 μm and highest particle size lower than 40 μm.

Melamine cyanurate: Melapur™ MC 25 manufactured by Ciba Specialty Chemicals.

Melamine polyphosphate: Melapur™ 200 manufactured by Ciba Specialty Chemicals.
Melamine pyrophosphate, MPP, manufactured by Cytec Industries
Stabilisers and Processing Aids.
Hyndered phenol heat stabiliser: Irganox® 1098 manufactured by Ciba Specialty Chemicals.
Polysiloxane oil (PMS): Dow Corning 200® 50CST.
Lubricant: ethylenediamine distearate (EBS).

RESULTS

Table 1 shows the flame retardant effect of aluminium phosphinate in unfilled PA 6.

The flame proofing effect ranking V0 at 3.2 mm in thickness is achieved either with the sole Aluminium phosphinate at concentrations higher than 12% w or with Aluminium phosphinate/melamine cyanurate combinations.

However the table 1 shows that flame retardant performances of melamine cyanurate, (formulation 7, have been found superior to the aluminium phosphinate ones.

TABLE 1

Flame retardant effectiveness of Aluminium phosphinate in unfilled PA 6 articles:

| | Formulations | | | | | | |
|---|---|---|---|---|---|---|---|
| | 1 | 2 | 3 | 4 | 5 | 6 | 7 |
| PA 6 (%) | 92 | 90 | 88 | 86 | 88 | 87 | 90 |
| AP (aluminium phosphinate) (%) | 8 | 10 | 12 | 14 | 6 | 8 | |
| MC (melamine cyanurate) (%) | | | | | 6 | 5 | 10 |
| UL 94 (3.2 mm) | nc | V1 | V0 | V0 | V0 | V0 | V0 |
| UL 94 (1.6 mm) | nc | V2 | V2 | V2 | V1 | V2 | V0 |
| UL 94 (0.8 mm) | nc | nc | nc | nc | nc | nc | V0 |

The table 2 shows the flame retardant effectiveness of Aluminium phosphinate (AP) in glass filled reinforced polyamide 6.

Samples which contain Aluminium phosphinate as such, at a concentration of 17% by weight and in presence of lubricating agent (EBS), rank V0, according to UL 94 flammability test, and pass the GWIT test.

In addition good flame retardant level, V0 at 3.2 mm in thickness and V1 at 1.6 mm in thickness, is even achieved with the combination Aluminium phosphinate/melamine cyanurate (form. 6)

TABLE 2

Flame retardant effectiveness of Aluminium phosphinate in PA6 + 30% Glass fibre (GF) reinforced articles

| | Formulation | | | | | | |
|---|---|---|---|---|---|---|---|
| | 1 | 2 | 3 | 4 | 5 | 6 | 7 |
| PA6 + 30% GF (%) | 90 | 83 | 80 | 78 | 82.5 | 77.5 | 82.5 |
| AP(Aluminium phosphinate) (%) | 10 | 17 | 10 | 7 | 17 | 7 | 17 |
| MC(melamine cyanurate) (%) | — | — | 10 | 15 | — | 15 | — |
| Irganox 1098 (%) | — | — | — | — | — | — | 0.5 |
| EBS (%) | — | — | — | — | — | — | 0.3 |
| Sorbitan dioleate (%) | — | — | — | — | 0.5 | 0.5 | — |
| UL94 (3.2 mm) | nc | V1 | V1 | V1 | V0 | V0 | V0 |
| UL94 (1.6 mm) | nc | V2 | nc | V1 | V0 | V1 | V0 |
| UL 94 (0.8 mm) | nc | V2 | nc | nc | V2 | V2 | V2 |
| GWIT 775/3 mm | — | — | — | — | — | — | pass |
| GWIT 775/2 mm | — | — | — | — | — | — | pass |

Table 3 shows the flame retardant performances of aluminium phosphinate in polyamide 6,6 glass fiber reinforced and the effect induced by dispersing agents and lubricants.

Samples which contain aluminium phosphinate as such at a level of 17% by weight, rank V0 at 0.8 mm in thickness and pass the GWIT test.

Satisfactory results have also been achieved with the combination Aluminium phosphinate/melamine polyphosphate or melamine pyrophosphate.

TABLE 3

Flame retardant effectiveness of Aluminium phosphinate in PA6,6 + 30% glass fiber reinforced.

| | Formulation | | | | | | | | |
|---|---|---|---|---|---|---|---|---|---|
| | 1 | 2 | 3 | 4 | 5 | 6 | 7 | 8 | 9 |
| PA66 + 30% GF (%) | 83 | 80 | 78 | 82.5 | 77.5 | 85.7 | 83.7 | 81.7 | 76.7 |
| AP (Aluminium phosphinate) (%) | 17 | 10 | 7 | 17 | 7 | 13 | 15 | 17 | 7 |
| melamine polyphosphate (%) | — | 10 | 15 | — | 15 | — | — | — | — |
| Melamine pyrophosphate (%) | — | — | — | — | — | — | — | — | 15 |
| Sorbitan dioleate (%) | — | — | — | 0.5 | 0.5 | — | — | — | — |
| EBS (%) | — | — | — | — | — | 0.3 | 0.3 | 0.3 | 0.3 |
| Irg 1098 | — | — | — | — | — | 0.5 | 0.5 | 0.5 | 0.5 |
| PMDS (polydimethyl siloxane) | — | — | — | — | — | 0.5 | 0.5 | 0.5 | 0.5 |
| UL94 (3.2 mm) | V0 | Nc | nc | V0 | V0 | nc | V0 | V0 | V0 |
| UL94 (1.6 mm) | V0 | nc | nc | V0 | V1 | nc | V0 | V0 | V0 |
| UL94 (0.8 mm) | nc | nc | nc | nc | nc | nc | V1 | V0 | V1 |
| GWIT 775/3 mm | pass | — | — | — | — | — | pass | pass | pass |
| GWIT 775/2 mm | — | — | — | — | — | — | pass | pass | pass |

The invention claimed is:

1. A halogen-free self-extinguishing thermoplastic moulding composition, consisting of:
   a) from 15% to 95% by weight of a polyamide, and
   b) from 1% to 30% by weight of aluminum phosphinate of formula $Al(H_2PO_2)_3$ having an average particle size (D50%) lower than 30 μm and a highest particle size lower than 100 μm, and
   where the total percentage by weight of components a) and b) is 100%, provided that when the aluminum phosphinate concentration is higher than 12% by weight, the flame proofing effects ranks V0 at 3.2 mm in thickness.

2. Thermoplastic moulding composition according to claim 1, wherein said aluminum phosphinate is present in an amount of from 7% to 20% by weight.

3. Thermoplastic moulding composition according to claim 1, wherein said aluminum phosphinate is present in an amount of from 12% to 18% by weight.

4. Thermoplastic moulding composition according to claim 1, wherein component a) is selected from the group consisting of polymers prepared either via polycondensation reaction of saturated dicarboxylic acid with a saturated diprimary amine or by a direct polycondensation reaction of an omega-amino alkanoic acid or mixture of such polymers.

5. Thermoplastic moulding composition according to claim 1, wherein said polyamide is selected from polyamide (Nylon) 6,6, polyamide (Nylon) 6, and polyamide (Nylon) 6/6,6.

6. A halogen-free self-extinguishing thermoplastic moulding composition, consisting of:
   a) from 15% to 95% b weight of a polyamide,
   b) from 1% to 30% by weight of aluminum phosphinate of formula $Al(H_2PO_2)_3$,
   c) up to 10% of a plurality of other additives selected from the group consisting of processing aids, stabilizers, lubricants, antidripping agents, antiacids and pigments as other components, and
   where the total percentage by weight of components a), b) and c) is 100%%, provided that when the aluminum phosphinate concentration is higher than 12% by weight, the flame proofing effects ranks V0 at 3.2 mm in thickness.

7. A method of preparing a halogen-free, self-extinguishing flame retarded thermoplastic article comprising adding to a thermoplastic moulding composition:
   a) from 15% to 95% by weight of a polyamide, and
   b) from 1% to 30% by weight of aluminum phosphinate of formula $Al(H_2PO_2)_3$, where the total percentage by weight of components a) and b) is 100%, provided that when the aluminum phosphinate concentration is higher than 12% by weight, the flame proofing of the article effects ranks V0 at 3.2 mm in thickness.

8. The method of claim 7 wherein in the thermoplastic moulding composition said aluminum phosphinate has an average particle size (D50%) lower than 30 μm and a highest particle size lower than 100 μm.

9. The method of claim 7 wherein in the thermoplastic moulding composition said aluminum phosphinate is present in an amount of from 7% to 20% by weight.

10. The method of claim 7 wherein in the thermoplastic moulding composition said aluminum phosphinate is present in an amount of from 12% to 18% by weight.

11. The method of claim 7 wherein in the thermoplastic moulding composition component a) is selected from the group consisting of polymers prepared either via polycondensation reaction of saturated dicarboxylic acid with a saturated diprimary amine or by a direct polycondensation reaction of an omega-amino alkanoic acid or mixture of such polymers.

12. The method of claim 7 wherein in the thermoplastic moulding composition said polyamide is selected from the group consisting of polyamide (Nylon) 6,6, polyamide (Nylon) 6, and polyamide (Nylon) 6/6.6.

* * * * *